ized-icon

(12) United States Patent
Ni et al.

(10) Patent No.: US 11,815,869 B2
(45) Date of Patent: Nov. 14, 2023

(54) EFFICIENT CONTROL AND/OR LINKING OF SMART DEVICES

(71) Applicant: GOOGLE LLC, Mountain View, CA (US)

(72) Inventors: Yuzhao Ni, Sunnyvale, CA (US); David Roy Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/688,583

(22) Filed: Mar. 7, 2022

(65) Prior Publication Data

US 2022/0187778 A1 Jun. 16, 2022

Related U.S. Application Data

(63) Continuation of application No. 16/617,994, filed as application No. PCT/US2019/022048 on Mar. 13, 2019, now Pat. No. 11,269,305.

(Continued)

(51) Int. Cl.
*H04L 12/28* (2006.01)
*G05B 19/042* (2006.01)
(Continued)

(52) U.S. Cl.
CPC ....... *G05B 19/042* (2013.01); *G06F 3/04847* (2013.01); *G06F 9/451* (2018.02);
(Continued)

(58) Field of Classification Search
CPC .......... G05B 19/042; G05B 2219/2642; G06F 9/451; G06F 3/04847; H04L 67/53; H04L 12/282
See application file for complete search history.

(56) References Cited

U.S. PATENT DOCUMENTS 8,510,764 B1 8/2013 Deselaers et al.
9,465,676 B1 10/2016 Lewis et al.
(Continued)

FOREIGN PATENT DOCUMENTS

CN 106462358 2/2017
CN 107438826 12/2017
(Continued)

OTHER PUBLICATIONS

European Patent Office; Communication pursuant to Article 94(3) issued in Application No. 20181454.8, 6 pages, dated Apr. 14, 2022.
(Continued)

*Primary Examiner* — Beau D Spratt
(74) *Attorney, Agent, or Firm* — Gray Ice Higdon

(57) ABSTRACT

Efficient control and/or linking of smart network connected devices. Some implementations are directed to rendering, within an active application that enables control of multiple smart devices from multiple parties, both: (1) an interactive graphical interface element that, when interacted with, causes corresponding control of smart device(s) of a third-party (3P); and (2) a selectable element that, when selected, causes execution of a deeplink to cause a 3P application to open in a state that presents additional information for the smart device(s). Some implementations are additionally or alternatively directed to, in response to determining that a 3P application is installed at a client device, but a smart device topology lacks any entries for 3P smart devices of the 3P, efficiently adding one or more particular smart devices of the 3P to the smart device topology.

20 Claims, 9 Drawing Sheets

Related U.S. Application Data

(60) Provisional application No. 62/774,755, filed on Dec. 3, 2018.

(51) Int. Cl.
*G06F 9/451* (2018.01)
*G06F 3/04847* (2022.01)
*H04L 67/53* (2022.01)

(52) U.S. Cl.
CPC ............ *H04L 12/282* (2013.01); *H04L 67/53* (2022.05); *G05B 2219/2642* (2013.01)

(56) References Cited

U.S. PATENT DOCUMENTS

| | | | |
|---|---|---|---|
| 11,269,305 | B2 | 3/2022 | Ni et al. |
| 2012/0124061 | A1 | 5/2012 | Macbeth et al. |
| 2012/0316984 | A1 | 12/2012 | Glassman |
| 2013/0111328 | A1 | 5/2013 | Khanna et al. |
| 2013/0211546 | A1 | 8/2013 | Lawson et al. |
| 2013/0326499 | A1 | 12/2013 | Mowatt et al. |
| 2015/0193217 | A1 | 7/2015 | Xiang et al. |
| 2015/0319006 | A1 | 11/2015 | Plummer |
| 2015/0326651 | A1 | 11/2015 | Ormseth |
| 2016/0226674 | A1* | 8/2016 | Kangshang ............ H04W 12/08 |
| 2016/0231973 | A1 | 8/2016 | Sirpal |
| 2016/0234075 | A1 | 8/2016 | Sirpal et al. |
| 2016/0239568 | A1* | 8/2016 | Packer .................. G06F 16/951 |
| 2017/0041304 | A1 | 2/2017 | Tai et al. |
| 2017/0153607 | A1 | 6/2017 | Li et al. |
| 2017/0169266 | A1 | 6/2017 | Wang |
| 2017/0192402 | A1 | 7/2017 | Karp et al. |
| 2018/0020039 | A1 | 1/2018 | Loeb |
| 2018/0096683 | A1 | 4/2018 | James et al. |
| 2018/0336010 | A1* | 11/2018 | Mukherjee .............. G10L 15/22 |
| 2019/0098089 | A1 | 3/2019 | Shim et al. |
| 2019/0124049 | A1* | 4/2019 | Bradley .............. H04L 12/2809 |
| 2019/0132307 | A1* | 5/2019 | Pitchaimani .......... H04L 63/083 |
| 2019/0214009 | A1 | 7/2019 | An et al. |
| 2019/0238358 | A1 | 8/2019 | Hurewitz |
| 2019/0384562 | A1* | 12/2019 | Jannace ................ H04L 63/102 |
| 2020/0124466 | A1 | 4/2020 | Lubas et al. |

FOREIGN PATENT DOCUMENTS

| | | |
|---|---|---|
| CN | 1078955// | 4/2018 |
| JP | 2017111781 | 6/2017 |
| JP | 2018522316 | 8/2018 |

OTHER PUBLICATIONS

Japanese Patent Office; Notice of Allowance issued in Application No. 2020-545322, 3 pages, dated Jun. 20, 2022.
The Korean Intellectual Property Office; Notice of Allowance issued for Application No. 10-2020-7028313, 3 pages, dated Jun. 23, 2022.
Ma, Y. et al., "DroidLink: Automated Generation of Deep Links for Android Apps"; arxiv.org; Cornell University Library; 21 pages; dated May 23, 2016.
European Patent Office; Communication issue in Application No. 20181454.8; 9 pages; dated Jan. 14, 2021.
Intellectual Property India; Examination Report issued in Application No. 202027036143; 7 pages; dated Nov. 18, 2021.
European Patent Office; Communication issue in Application No. 19714913.1; 9 pages; dated Dec. 7, 2021.
Korean Intellectual Property Office; Office Action issued in Application No. KR 10-2020-7028313; 6 pages; dated Nov. 30, 2021.
European Patent Office; Invitation to Pay Additional Fees in Ser. No. PCT/US2019/022048; 17 pages; dated Sep. 2, 2018.
European Patent Office; International Search Report and Written Opinion of Ser. No. PCT/US2019/022048; 21 pages; dated Nov. 6, 2019.
China National Intellectual Property Administration; Notification of First Office Action issued in Application No. 201980020663.0; 15 pages; dated Feb. 23, 2023.
China National Intellectual Property Administration; Notice of Grant issued in Application No. 201980020663.0; 4 pages; dated Jul. 31, 2023.

* cited by examiner

EFFICIENT CONTROL AND/OR LINKING OF SMART DEVICES

BACKGROUND

Applications and interfaces have been proposed that enable a user to control each of multiple smart devices associated with the user (e.g., associated with an account of the user). For example, some automated assistant interfaces enable a user to provide spoken, typed, touch, and/or other input to control various smart devices. Also, for example, some home control applications enable a user to interact with graphical elements and/or to provide spoken input to control various smart devices. For instance, some automated assistants include a companion home control application that enables a user to configure various aspects of the automated assistant, to control various smart devices that are linked to the automated assistant, etc.

In many situations, one or more of the smart devices controlled via an assistant interface and/or a home control application are manufactured by a corresponding third-party (3P). A third-party or 3P, as used herein, references a party that is distinct from the party that controls an automated assistant interface and/or home control application being referenced. A first-party or 1P, as used herein, references the party that controls the automated assistant and/or home control application being referenced. A 3P often provides a 3P application that is devoted to control and management of one or more 3P smart devices of the 3P (while optionally not enabling control of any smart device(s) that are not manufactured by the 3P). For example, a particular 3P that manufactures smart lights can provide a 3P application that is devoted to control and management of smart lights of the 3P. Further, a 1P may manufacture smart device(s) and provide a separate 1P application that is devoted to control and management of one or more of the smart devices of the 1P (while optionally not enabling control of any smart device(s) that are not manufactured by the 1P).

Controlling multiple smart devices from an automated assistant interface and/or a home control application provides various computational efficiencies. For example, a home control application executing on a client device can enable control of three different smart devices from three different 3Ps, all from within the home control application. This can be more computationally efficient than, for example, launching and executing three separate 3P applications (which can utilize significant memory and/or processor resources), from the three different 3Ps, to enable the control of the three different smart devices. Further, a lesser quantity of user interface inputs can be utilized, within the home control application, to control the three different smart devices—at least relative to the user interface inputs that would be required to launch the three different 3P apps and navigate within each of the three different 3P apps to control the three different smart devices.

Despite the computational efficiencies afforded by automated assistant interfaces and home control applications, it is often the case that one or more smart devices of a user are not linked to an automated assistant and/or home control application and, thus, are not controllable via the automated assistant and/or home control application. Accordingly, less efficient means are utilized in control of those unlinked smart device(s).

Additionally or alternatively, while automated assistant interfaces and/or home control applications enable a user to control 1P smart device(s) and/or 3P smart device(s) (including smart devices from multiple disparate 3Ps), in many instances the control afforded can be restricted relative to the control afforded via separate 1P and/or 3P applications that are devoted to control and management of the smart devices. For example, for a 3P smart thermostat, a home control application can present a graphical interface element that enables the user to adjust a set point of the thermostat. However, other feature(s) of the 3P thermostat may not be adjustable via the home control application—but may be adjustable via a 3P application that is primarily devoted to control of the 3P thermostat and optionally other smart device(s) of the 3P. For example, a mode (e.g., cool/heat/cool and heat) of the thermostat, fan control (e.g., run fan for 4 hours, 6 hours, or 8 hours), a schedule of the thermostat, and/or other feature(s) of the 3P thermostat may be controllable via the 3P application, but not controllable via the home control application. In situations where a user would like the control afforded by the 3P application, the user must locate and launch the 3P application, and often must navigate through the 3P application to identify an interface for the 3P thermostat and/or an interface for the desired control.

SUMMARY

Implementations disclosed herein are directed to efficient control and/or linking of smart network connected devices (also referred to herein as smart devices or Internet of Things (IoT) devices) such as smart home alarms, smart door locks, smart cameras, smart lights, smart thermostats, smart weight scales, smart beds, smart irrigation systems, smart garage door openers, smart plugs, smart appliances, smart baby monitors, smart fire alarms, smart moisture detectors, etc.

Some implementations disclosed herein are directed to rendering, within an active application that enables control of multiple smart devices from multiple parties (e.g., a home control application described above), both: (1) an interactive graphical interface element that, when interacted with, causes corresponding control of smart device(s) of a 3P; and (2) a selectable element that, when selected, causes execution of a deeplink to cause a 3P application to open in a state that presents additional information for the smart device(s). The 3P application can be primarily (or solely) devoted to control of smart device(s) of the 3P.

The additional information for the smart device(s) that is presented when the application opens in the state is in addition to the interactive graphical interface element and/or any other information that is presented by the active application. For example, the additional information can include at least one additional graphical element that, when interacted with, causes control of one or more properties of the smart device(s), where the control of the one or more properties is not enabled via interaction with the at least one interactive graphical interface element rendered via the application. In these and other manners, selection of the selectable element causes the 3P application to open in a state that enables further control of the smart device(s) of the 3P. This is more computationally efficient, and requires a reduced quantity of user inputs, relative to the user instead locating an icon for the 3P application, selecting the icon to launch the 3P application, then performing one or more user inputs within the 3P application to navigate to the state that enables further control of the smart device(s).

In some of those implementations, the deeplink is generated by the 3P responsive to a request that is addressed to a particular address for the 3P (e.g., an address for an application programming interface (API) of the 1P or 3P), and that includes an identifier of the smart device(s). For example, a 3P can generate the deeplink so that it causes a 3P application to be opened in a state that presents additional information for the smart device(s) indicated by the identifier. By having the 3P generate the deeplink, instead of relying on a deeplink stored by a 1P of the active application, the 3P can generate the deeplink so that it conforms to a current schema of the 3P application, thus preventing usage of stale (or "broken") stored links that no longer conform the current schema. Further, memory and/or storage resources of the 1P can be conserved by not having to store a large quantity of deeplinks and instead relying on deeplinks dynamically provided by 3Ps. Yet further, the 3P can optionally generate the deeplink in view of recent event(s) related to the smart device(s) that may be accessible to the 3P, but inaccessible to the 1P of the active application. This can enable the 3P application to be opened in a state that is tailored to the recent event(s), thus providing relevant additional information with reduced latency. As one non-limiting example, the 3P smart device(s) can include a 3P smart camera and a deeplink generated at a given time can link to a state of the 3P application that causes the 3P application to provide a video clip of a recent activity detection that occurred via the 3P camera. Such a deeplink can be generated based on the 3P determining that the recent activity detection occurred within a threshold amount of time prior to the request. For example, the 3P can generate such a deeplink if the recent activity detection occurred less than five minutes from the request. If no recent activity detection occurred, the 3P can generate an alternative deeplink, such as a deeplink that results in the 3P application opening in a state that shows a current activity feed, and enables adjustment of smart camera feature(s) (e.g., zoom, pan, and/or tilt) that are not adjustable via the active application.

In various implementations where the deeplink is generated by the 3P responsive to a request that is addressed to a particular address for the 3P, the request is generated by the active application in response to user interface input that is determined to be a request for rendering graphical interface element(s) that enable control of the smart device(s) of the 3P. For example, the active application can initially present icons for multiple disparate smart devices that can be controlled, including a particular smart device of the 3P, as well as other smart devices (of the 3P and additional 3Ps). Responsive to selection of an icon for the particular smart device of the 3P, the active application can generate a request that identifies the particular smart device, and transmit the request to the particular 3P address. As another example, the active application can receive a spoken utterance that is a request for rendering graphical interface element(s) that enable control of the smart device(s) of the 3P and, in response, generate and transmit the request to the particular 3P address. For example, the spoken utterance can be "turn on couch light", and can be determined to be a request for rendering graphical interface element(s) that enable control of the smart device(s). For instance, the spoken utterance can be determined to be a request to transmit a command that causes the "couch light" to be turned "on", and to render a graphical interface element that enables control of a dimming level and/or other property of the "couch light". In response to determining the spoken utterance is a request for rendering the graphical interface element, the request can be generated and/or transmitted. In these and other manners, requests to a 3P are only generated and/or transmitted responsive to inputs that are requests for rendering graphical interface element(s) that enable control of smart device(s) of the 3P. Thus, in various implementations computational resources utilized in generating the request and/or network bandwidth utilized in transmitting the request, are only utilized when certain condition(s) are satisfied (e.g., only when it is determined an input is a request for rendering graphical interface element(s) that enable control of smart device(s)). Moreover, in some of these and/or other implementations, a request is generated and/or transmitted further responsive to determining that the 3P application is installed at a client device executing the active application. In these and other manners, generating and/or transmitting a request to a 3P can be bypassed when it is determined that the 3P application is not installed. In some of those situations, a default deeplink for the 3P can instead be utilized, such as a default deeplink that links to a webpage or "play store" application state, either of which enable installation of the 3P application.

Some implementations disclosed herein are additionally or alternatively directed to determining that a 3P application is installed at a client device associated with a user account, where the 3P application enables control of 3P smart device(s) of the 3P. Those implementations further determine whether a smart device topology includes any entries for any of the 3P smart device(s) of the 3P. The smart device topology is associated with the user account and is utilized by an automated assistant in controlling smart devices via interaction with the automated assistant. The smart device topology can define, for example, smart devices, automated assistant devices, manufacturers of each, location(s) of each (e.g., "living room", "kitchen"), semantic identifier(s) of each (e.g., "couch light", "living room assistant device"), and/or other feature(s) of smart devices and/or automated assistant devices.

In response to determining that a 3P application is installed at a client device, but the smart device topology lacks any entries for 3P smart devices, output can be rendered, at the client device or an additional client device associated with the user account, where the output includes a suggestion for adding the 3P to the smart device topology. Responsive to receiving affirmative user interface input in response to rendering of the output, one or more particular smart devices, of the 3P, can be efficiently added to the smart device topology. For example, the user account can be utilized to interface with an application programming interface (API) of the 3P in automatically adding, to the smart device topology, particular devices, of at least some of the one or more 3P smart devices. Also, for example, a sign-in interface can be presented that enables signing-in to a 3P account that is particularized to the 3P and that, when utilized to sign-in to the 3P account, causes interfacing with the API, or an additional API, of the 3P in automatically adding the particular devices to the smart device topology. As yet another example, the particular smart devices can be added to the smart device topology through interfacing with the third party application installed at the client device, as described in more detail herein. In these and other manners, the particular smart devices are added to the device topology in a manner that is more efficient than, for example, navigating through a home control application to a screen where 3P device(s) can be added, identifying the 3P from amongst a long list of available 3Ps (e.g., scrolling through the list), then selecting the identified 3P, from amongst the list, to cause a sign-in interface to be presented that enables signing-in to a 3P account that is particularized to the 3P.

Further, when 3P smart device(s) are added to a smart device topology in response to proactively suggesting adding of the 3P smart device(s) to the smart device topology, control of those 3P smart device(s) is enabled through the automated assistant interface and/or a home control application. Such control provides various computational efficiencies. For example, a home control application executing on a client device can enable control of the 3P smart devices, as well as smart devices from other 3Ps, all from a single application. This can be more computationally efficient than, for example, launching and executing multiple separate 3P applications (which can utilize significant memory and/or processor resources) to enable the control of the different smart devices.

Some implementations disclosed herein are directed to, in response to determining that a 3P application is installed at a client device and that an associated smart device topology lacks any entries for any of the 3P smart device(s) of the 3P, directly interfacing with the third party application in automatically adding smart device(s) of the 3P to the smart device topology. In some of those implementations, a particular application (e.g., an automated assistant application or a home control application) of the client device can validate the 3P application. If the 3P application is validated, the particular application can provide an intent to execute the third party application with a linking function. For example, the intent can be provided to an operating system of the client device to cause the operating system client device to execute the third party application by calling the intent. The intent can be specific to a linking function of the third party application that, when executed by the third party application, causes the third party application to return at least one access token (e.g., a long-term and/or short-term access token) if one or more conditions are satisfied. The one or more conditions can include, for example, verification of the application providing the intent, as described in more detail below. The at least one access token can be received from the third party application responsive to providing the intent. Further, the at least one access token can be utilized to obtain additional information related to the 3P smart device(s), and at least some of the obtained additional information can be added to the smart device topology. The access token can also enable control of the 3P smart device(s) by an automated assistant (e.g., by including it in requests from the automated assistant and/or in obtaining updated short-term access tokens). Adding smart device(s) of a 3P to a smart device topology can enable control of those smart device(s) from a single application, which can be resource efficient as mentioned above. Moreover, local interaction, at the client device between an automated assistant application or home control application, and a 3P application, in adding the smart device(s), can utilize minimal network resources in adding the smart device(s).

The above is provided as an overview of some implementations disclosed herein. Further description of these and other implementations is provided below.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
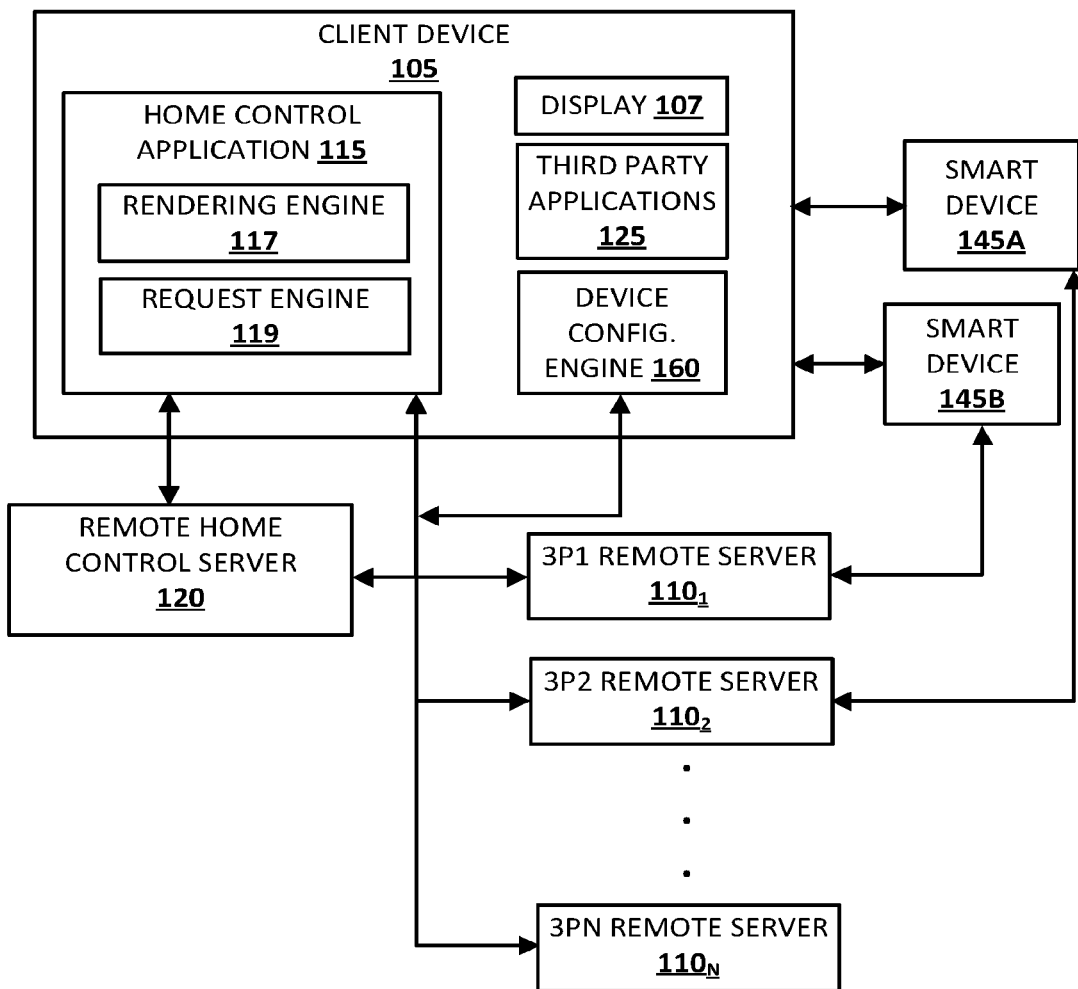
FIG. 1 is a block diagram of an example environment in which implementations disclosed herein can be implemented.

Some implementations described herein are directed to causing a graphical interface of an active application to be rendered with a selectable graphical element that, when selected, causes execution of a deeplink to a 3P application. The deeplink can be generated responsive to a request, from the active application, that indicates a 3P smart device that the user is currently interacting with via the active application. The deeplink can be generated by the 3P "on the fly", and the deeplink enables the user to access the 3P application directly from the active application, and to access a state of the 3P application that is particularized to the 3P smart device that is current being interacted with via the active application.

In some implementations, user interface input directed toward an active application executing on a client device is received. The input can be related to a particular functionality that the user is accessing to control one or more 3P smart devices. For example, the input can be a request to render one or more graphical interface elements that are related to controlling the 3P smart devices. Also, for example, the input can be a request to render a graphical interface that allows the user to control the brightness of one or more 3P smart lights and/or to turn the one or more 3P smart lights on/off. The one or more graphical interface elements rendered responsive to the request can include one or more sliders to adjust the brightness of the 3P smart lights and/or one or more toggle buttons to turn on or off the 3P smart lights.

Responsive to the input relating to the 3P smart device(s), a request is generated and transmitted, by the active application, to a 3P system that corresponds to the 3P smart device(s). The 3P system is associated with a 3P application that is specifically designed to control the smart lights that are manufactured by the 3P, and the 3P application can be installed on the same client device where the active application (e.g., a home control application) is executing.

In some instances, the 3P application includes additional functionality, for the 3P smart devices, that is not available via the active application. Continuing with the smart light example, the 3P application may include functionality to program the 3P smart lights to automatically turn on at particular times of the day, to change a color temperature of the smart lights, and/or to control other functionality of the smart lights apart from the functionality that is available via the active application. Thus, in order to provide input related to the additional functionality, the user may be required to access the 3P application.

The request to the 3P system can include, for example, an identifier of the particular smart device that the user is controlling via the active application, the specific interface that the user is accessing, the functionality available via the specific interface, and/or additional information regarding the current interaction of the user with the active application.

The 3P system can determine the related interface and/or functionality of the smart device of interest that is available via the third party application. For example, the user may be accessing an interface that allows control of a smart light that is named "living room light." The request can include an identifier for the smart light such that the 3P can identify the related interface for that smart device.

Responsive to the request, the 3P system can transmit a deeplink that is a deeplink to the 3P application. The active application can render the interactive graphical interface element(s) that allow the user to control the smart device(s) of interest. Further, the active application can render, simultaneously with the interactive graphical interface element(s), a selectable graphical element that corresponds to the provided deeplink (e.g., a selectable icon and/or button.) Thus, when the user is presented with the interactive graphical interface element(s) via the active application, the selectable graphical element can also be presented and, when selected, can cause opening of the 3P application in a state that is particularized to the smart device(s).

Some implementations described herein are additionally or alternatively directed to configuring one or more 3P smart devices for control via an automated assistant and/or a home control application. Some of those implementations determine that a 3P application is installed at a client device associated with a user account, where the 3P application enables control of 3P smart device(s) of the 3P. Those implementations further determine whether a smart device topology includes any entries for any of the 3P smart device(s) of the 3P. The smart device topology is associated with the user account and is utilized by an automated assistant in controlling smart devices via interaction with the automated assistant. In response to determining that a 3P application is installed at a client device, but the smart device topology lacks any entries for 3P smart devices, output can be rendered, at the client device or an additional client device associated with the user account, where the output includes a suggestion for adding the 3P to the smart device topology. Responsive to receiving affirmative user interface input in response to rendering of the output, one or more particular smart devices, of the 3P, can be efficiently added to the smart device topology.

Now turning to FIG. 1, an example environment is illustrated in which techniques disclosed herein may be implemented. The example environment includes a client device 105, smart devices 145A and 145B, remote home control server 120, and third-party (3P) remote servers $110_{1-N}$. As described herein, each of the 3P remote servers $110_{1-N}$ can be associated with a different corresponding 3P, of multiple 3Ps. For example, 3P1 remote server $110_1$ can be associated with a first 3P that manufacturers one or more corresponding smart lights, 3P2 remote server $110_2$ can be associated with a second 3P that manufacturers one or more corresponding smart lights, and 3PN remote server $110_N$ can be associated with a third 3P that manufacturers one or more corresponding smart cameras, smart thermostats, and smart alarm systems. Although remote home control server 120 and the 3P remote servers $110_{1-N}$ are each illustrated in FIG. 1 as a single component, it is understood that one or more modules and/or aspects of either can be implemented, in whole or in part, by multiple devices. For example, in some implementations one or more aspects described as being implemented by a remote server can be implemented by a cluster of high performance remote server device(s) that handle requests from one or more client devices, as well as requests from additional devices. Also, one or more components described as components of client device 105 can be implemented by one or more remote components that interface with client device 105 over one or more networks.

Client device 105 may be a mobile phone computing device, a tablet computing device, a stand-alone device devoted primarily to assistant functionality, and/or a wearable apparatus of the user that includes a computing device (e.g., a watch of the user having a computing device, glasses of the user having a computing device, a virtual or augmented reality computing device). Additional and/or alternative client devices may be provided. Further, one or more components of client device 105 may be implemented on separate devices. For example, graphical display 107 may be implemented on one or more alternate computing devices that are in communication with client device 105. Client device 105, remote home control server 120, third-party (3P) remote servers $110_{1-N}$, and/or smart devices 145A and 145B can communicate via one or more communication networks. The communication network(s) can include, for example, a local area network (LAN) and/or a wide area network (WAN) (e.g., the Internet). Smart device 145A is manufactured by the first 3P associated with 3P1 remote server $110_1$ and can be controlled via commands transmitted from 3P1 remote server $110_1$ (optionally in response to corresponding commands being communicated via home control application 115, a corresponding one of third party applications 125, and/or an automated assistant application) and/or can be controlled by client device 105 directly. Smart device 145B is manufactured by the second 3P associated with 3P2 remote server $110_2$ and can be controlled via commands transmitted from 3P2 remote server $110_2$ (optionally in response to corresponding commands being communicated via home control application 115, a corresponding one of third party applications 125, and/or an automated assistant application) and/or can be controlled by client device 105 directly.

Client device 105 includes a display 107 that can render content to a user of the client device 105 and that is optionally touch-sensitive to enable touch inputs to be received via the display 107. For example, a user may utilize the display 107 to interact with a home control application 115 to control one or more smart devices of the user. The user may view one or more interfaces via display 107, where the interfaces are rendered by rendering engine 117 or other rendering engine(s). The interfaces allow the user to provide input and/or view output via display 107. The user may interact with the display 107 via one or more input devices, such as a keyboard, a mouse and/or other input device that can select an area of the display 107, voice controls, touchscreen controls, and/or other input methods that allow the user to submit input and select content to be rendered. Input received via display 107 may be provided to one or more applications executing on client device 105, such as home control application 115 and/or third party application 125.

Home control application 115, when executed and active at the client device 105, can be utilized by the user to control one or more smart devices of the user, such as smart devices 145A and 145B. Home control application 115 can optionally interface with remote home control server 120 in performing some or all of the functions described herein. A smart device can be an intelligent, multi-sensing, network-connected device configured to communicate with a central server, a cloud-computing system, and/or one or more additional smart devices to provide any of a variety of useful smart home services. For instance, a smart device can be, or can otherwise be associated with, an air conditioning system, lighting device, home theater and entertainment system, security system, automatic door locking system, thermostat device, home automation system, sound speaker, camera device, treadmill, weight scale, smart bed, irrigation system, garage door opener, appliance, baby monitor, fire alarm, and/or other suitable device or system.

One of the third party applications 125 installed on the client device 105 can optionally be provided by the first 3P that manufactured smart device 145A, and can be utilized to control smart device 145A. Such a third party application can optionally enable control of smart devices of the first 3P, but not enable control of smart devices of other 3P(s) (e.g., any other 3Ps). Further, another one of the third party applications 125 installed on the client device 105 can optionally be provided by the second 3P that manufactured smart device 145B, and can be utilized to control smart device 145B. Such a third party application can optionally enable control of smart devices of the second 3P, but not enable control of smart devices of other 3P(s) (e.g., any other 3Ps). For example, one of the third party applications 125 can render a graphical user interface via display 107 that provides one or more graphical elements that allow the user to control smart device 145A.

Home control application 115 is also installed on the client device 105, and enables control of smart devices from multiple 3Ps, including smart devices 145A and 145B, and potentially other (unillustrated) smart devices that are configured for the home control application 115 (e.g., assigned in a smart device topology utilized by the home control application 115). Home control application 115 includes a rendering engine 117, which can render an interface that includes one or more graphical elements to allow the user to control smart device 145A and/or smart device 145B. Input of the user provided via display 107 and/or other input device can be provided to the home control application 115, which can process the input and provide instructions to rendering engine 117 to render one or more additional graphical interfaces and/or update an active interface.

Home control application 115 can include some or all of the same controls as one or more of the third party applications 125. For example, smart device 145A may be a smart lighting unit that is manufactured by the first 3P, which also provides one of the installed third party applications 125. The third party application of the first 3P can allow control of the smart lighting unit 145A. Further, the home control application 115 can enable control of the smart lighting unit 145A through, for example, one or more graphical interface elements that are rendered by home control application 115 (via rendering engine 117), and through communicating corresponding control commands to the lighting unit 145A directly, or to an application program interfaces ("API") of the 3P (e.g., via 3P1 remote server $110_1$), which then generates and provides corresponding control commands to the lighting unit 145A. Additionally or alternatively, smart device 145B may be another device that is manufactured by the second 3P, which also provides another one of the installed third party applications 125. The smart device 145B is also controllable via home control application 115.

In some instances, the home control application 115 may allow the user to control only a subset of the functionality of the smart device 145A and/or smart device 145B, as compared to the functionality that can be controlled via the respective third party applications 125. For example, referring to FIG. 2, an example interface 200 of home control application 215 is illustrated. The interface 200 includes an "on/off" toggle button 205 that is an interactive graphical element and that allows the user, via input directed to the toggle button 205, to turn a lighting unit on or off. Further, interface 200 includes slider element 210 that is another interactive graphical element and that allows the user, via input directed to the slider element 210, to adjust the brightness of the same lighting unit. In contrast, referring to FIG. 3, an example interface 300 of one of the third party applications 125 is illustrated. The interface 300 includes toggle button 305 that allows the user to turn the same lighting unit on and off. Further, interface 300 includes a slider 310 to adjust the brightness of the lighting unit. However, interface 300 further includes a slider 315 to adjust the color temperature of the lighting unit, as well as a scenes button 320 that, when selected, enables the user to select one of a plurality of configured scenes for the lighting unit. This functionality is not included with interface 200. Thus, the third party application 125 includes more options for controlling the lighting unit than does the home control application 115.

In some implementations, the user may have interest in accessing the functionality for a smart device that is included in the interface of one of the 3P applications 125, but that is not included in an active application, such as home control application 115. For example, a user may have interest in adjusting the color of lighting unit but, when opening the interface of the home control application 115, discover that a graphical element for color control is absent. Further, in some instances, a user may access the control interface of the home control application 115 that includes less functionality than a corresponding one of the third party applications 125, but may not be aware that additional functionality is available for the smart device. In these instances, to adjust the color of the lighting unit, the user would be required to navigate away from the active home control application 115, locate an icon for a corresponding one of the third party applications 125, tap the icon to cause that third party application 125 to be launched, then navigate within that 3P application 125 until a state of that 3P application 125 is reached that enables adjustment of the color of the lighting unit.

In some implementations, instead of requiring a user to perform multiple inputs to locate a 3P application, launch the 3P application, and navigate within the 3P application to a desired state of the 3P application—a selectable interface element can instead be presented within the home control application 115 that, when selected, executes a deeplink that causes the corresponding 3P application to be launched in the desired state. In various implementations, the deeplink is generated dynamically at a corresponding server of the 3P (e.g., one of the 3P remote servers $110_{1-N}$). In this manner, the deeplink can be generated in view of smart device(s) being viewed and/or otherwise interacted with via the home control application 115. Further, the deeplink can be generated in view of any updates that have been made to a corresponding 3P application and/or a corresponding 3P backend interface, such as updates to a schema that is utilized by the 3P application and/or the 3P backend interface to cause the 3P application to open in a desired state.

For example, referring again to FIG. 1, the smart device 145A can be controlled by one of the 3P applications 125 and the user may be accessing an interface of the home control application 115 that is directed to control of only smart device 145A. Instead of providing, in the interface of home control application 115, only a link to an interface, of the one of 3P applications 125, that is not specific to smart device 145A (e.g., directed to a "home" interface of that third party application 125)—implementations disclosed herein can additionally or alternatively provide a deeplink that is specific to smart device 145A. For example, the deeplink, when executed, can cause the corresponding one of the 3P applications to open in a state that includes controls that are specific to the smart device 145A, including control(s) that are not provided via the home control application 115.

In some implementations, request engine 119 of home control application 115 can generate a request that can include a reference to particular smart device(s). The request engine 119 can generate the request in response to received input (received via the home control application 115) including a request for rendering of one or more interactive graphical interface elements that enable control of the particular smart device(s). The request can include the reference to the particular smart device(s), and can be addressed to a corresponding one of the 3P remote servers $110_{1-N}$ based on that 3P remote server being associated with a 3P that is also the manufacturer of the particular smart device(s). The request engine 119 can be in communication with the 3P remote server directly, or via the remote home control server 120. The request engine 119, or the remote home control server 120, can transmit the request to 3P remote server, utilizing an API, such as an API that is utilized for communications between the home control application 115 and one or more of the 3P remote servers $110_{1-N}$.

In some implementations, the home control application 115 can determine that the client device 105 does not include a corresponding 3P application for the particular smart device(s) being interacted with via the home control application. For example, the 3P application that is associated with smart device 145A may not be installed on client device 105. In some of those instances, home control application 115 can bypass generating a request so as to minimize network traffic in view of any generated deeplink for the 3P application not being executable at the client device 105 (since the 3P application is not installed). Further, in some of those instances a default link for the 3P can instead be utilized, such as a link to a particular webpage of the 3P, to a state of an application store that enables the 3P application to be downloaded, etc.

Based on the information included in the request, a corresponding one of the 3P remote servers $110_{1-N}$ generates a deeplink that is directed to a particular state of its 3P application, that is associated with the same smart device(s) associated with the request. For example, a request may include an identifier for the smart device(s), for which interactive graphical element(s) are being rendered via the home control application 115. The request can be transmitted to one of the 3P remote servers $110_{1-N}$ which, based on the identifier for the smart device(s), can generate a deeplink to provide to the home control application 115 and that, when executed, causes the client device 105 to open a corresponding one of the third party applications in a state that is particularized to the same identified smart device.

In some implementations, the identifier of the smart device included in the request may be different than a proprietary identifier utilized by a corresponding 3P remote server and/or a corresponding 3P application. The identifier can be a key that is utilized in communications between the home control application 115 and the 3P remote server, and can be mapped by the 3P remote server to a corresponding proprietary identifier. For example, the home control application 115 may have an identifier for a smart device of "12345." However, the third party may have a proprietary identifier for the same device of "67890", and can maintain a local mapping between the "12345" identifier and the proprietary identifier of "67890".

Figure 2:
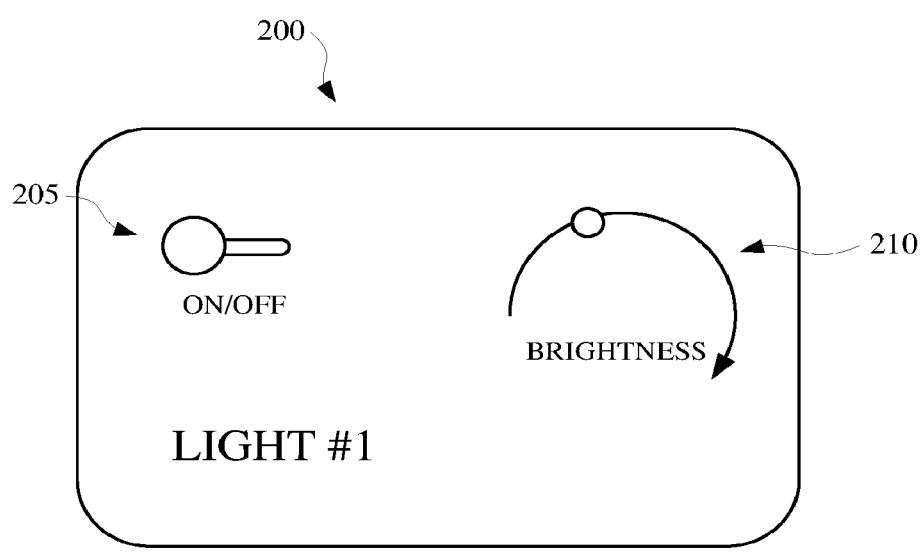
FIG. 2 illustrates an example interface of a home control application.
Figure 3:
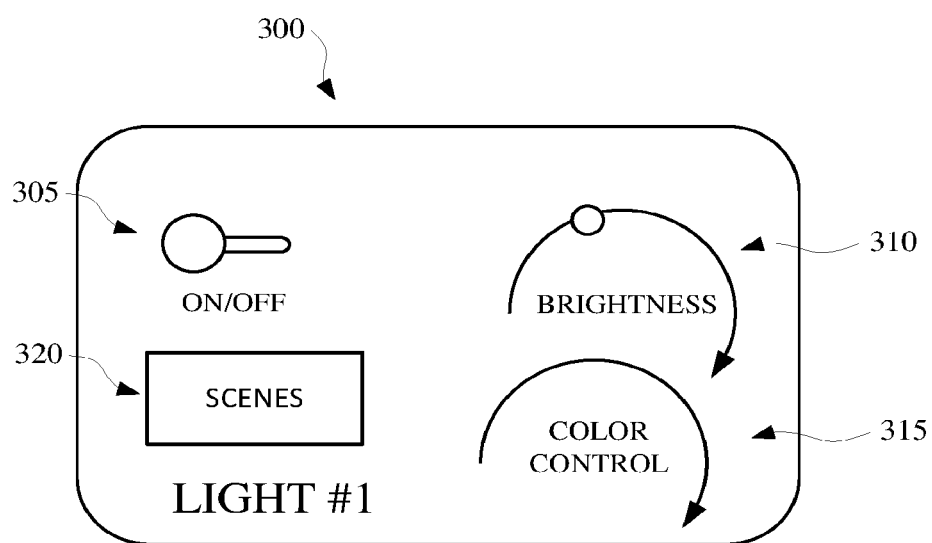
FIG. 3 illustrates an example interface of a third party application primarily devoted to control of one or more smart devices of the third party.

As one example, the user can provide input, via the home control application 115, to cause the interface illustrated in FIG. 2 to be rendered by the home control application 115. The interface enables control of a particular smart device. In response to the input, request engine 119 can generate a request that identifies the particular smart device, and transmit the request to an address corresponding one of the 3P remote servers $110_{1-N}$. Responsive to receiving the request, that 3P remote server can generate a deeplink to the interface illustrated in FIG. 3 and provide the deeplink to the rendering engine 117. Rendering engine 117 may then utilize the deeplink to generate a graphical element that can be included in the accessed interface illustrated in FIG. 2. For example, referring to FIG. 4, an interface 400 is provided that includes the elements 405 and 410 that are the same as elements 205 and 210 included in the interface illustrated in FIG. 2, but that also includes button 415. Button 415 may be associated with the deeplink and, upon selection of button 415, the user may then be directed to the interface of FIG. 3. For example, selection of the button 415 can cause a corresponding one of the 3P applications 125 to be opened, and cause the corresponding one of the 3P applications to open with the interface of FIG. 3. Thus, the user can be directed to an interface 300 that allows the user additional functionality not available via the interface of FIG. 4 (i.e., via the color controls 315 and/or scenes button 320 included in interface 300).

Figure 4:
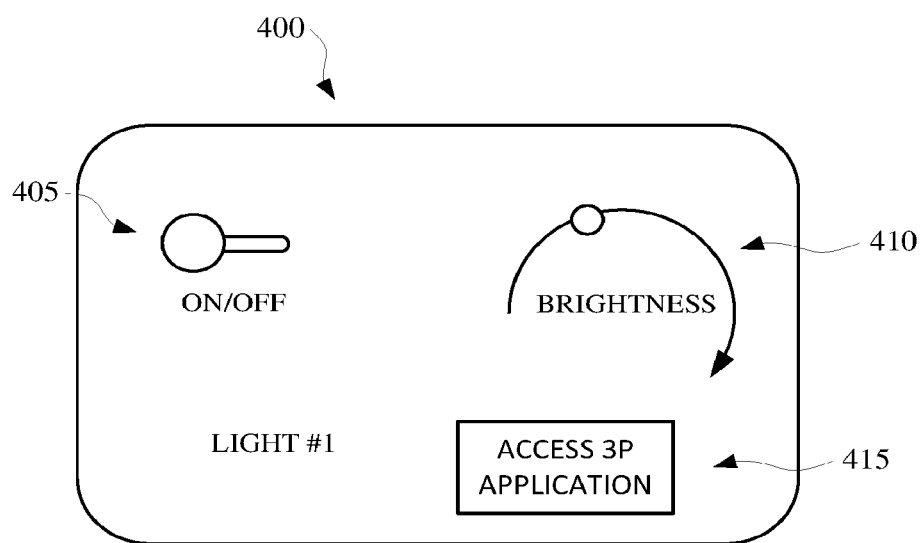
FIG. 4 illustrates the example interface of the home control application of FIG. 2, with the example interface including a selectable graphical element that is associated with a generated deeplink.

In some implementations, the provided deeplink may incorporate, or be transmitted with, additional information that indicates a particular selectable graphical element that should be presented in FIG. 4. For example, where the deeplink is directly to a state that enables only color control of a smart light, the additional information can indicate a particular selectable graphical element that has a color wheel or other indicia indicative of color control. Also, for example, where the deeplink is directly to a state that enables configuring of a schedule of the smart light, the additional information can indicate a particular selectable graphical element that includes a calendar or other indicia indicative of schedule control. In these and other manners, a 3P can be provided control over what deeplink is provided (and, as a result, the state in which the 3P application is opened), as well as control over what graphical element(s) are utilized to indicate functionality of the deeplink.

As another example, the user may access an interface of the home control application 115 that is directed to a camera smart device. Through the home control application 115, the user may only be able to view a live video feed from the camera smart device. However, additional functionality can be provided via a 3P application for the camera smart device, such as functionality to allow the user to view video footage from one or more past events captured by the camera smart device, functionality to enable the user to zoom/pan/tilt the camera, etc. In such an example, a corresponding one of the 3P remote servers $110_{1-N}$ can generate a deeplink that, when executed, opens a corresponding one of the 3P applications 125 in a state that shows the footage from the past events and/or in a state that enables adjustment of the zoom/pan/tilt. The 3P remote server can optionally determine to generate the deeplink that causes the 3P application to be opened in a state that shows the footage from the past events responsive to determining that one or more criteria are satisfied. For example, such a deeplink can be generated by the 3P remote server utilizing information that is proprietary to the 3P, such as information that indicates the past events have occurred and/or have occurred in the last X minutes.

In some implementations, the home control application 115 or an automated assistant application can identify one or more third parties for which a user has not yet configured any corresponding devices to be controlled via the home control application 115 and/or via an automated assistant application. The automated assistant application can optionally be associated with, but separate from, the home control application 115. For example, the automated assistant application and the home control application 115 can both be controlled by the same 1P. For example, a third party application may be installed on the client device 105 but the user has not gone through one or more steps to integrate the home control application 115 and/or the automated assistant application to communication with smart device(s) of the user that are associated with the 3P application 125. Because the user may not be aware of the protocol for setting up a smart device and/or may not realize a smart device is not yet controllable by the home control application, the user may be aided by one or more notifications that smart device(s) from the 3P are available to be configured.

In some implementations, the home control application 115 may utilize a device topology representation to identify that smart devices from a particular 3P are not included in the device topology. The device topology representation can be constructed using various suitable techniques and can be any suitable format and/or structure capable of representing the topology and organization of one or more smart devices within one or more structures. The device topology representation can define and/or organize one or more structures associated with the user (e.g., a user account of the user). For instance, a structure associated with the user can be a home, business, vehicle, office, and/or any other suitable structure associated with the user. The user may organize each structure into one or more rooms (e.g. bedroom, living room, kitchen), and can assign one or more smart devices to the one or more rooms. For instance, the user can assign one or more smart lights to a first room of a particular structure, and one or more door locking systems to a second room of the structure. The user can then assign one or more different smart devices to one or more rooms within a second structure.

The user can assign one or more identifiers to the smart devices within the device topology representation. The identifiers can be chosen by the user and associated with the respective smart devices within the device topology representation. The identifier(s) can include nicknames and/or aliases selected for the smart devices by the user (e.g. couch lamp, front door lock, bedroom speaker, etc.). In this manner, the identifiers can be names or aliases of the respective smart devices that the user is likely to use when providing voice utterances for controlling the smart devices.

The device topology representation can further specify one or more device attributes associated with the respective devices. The device attributes can be associated with one or more actions that the smart devices are configured to perform. For instance, the device attributes associated with a lighting device can include a turn on capability, a turn off capability, a dimming capability, and/or other suitable attributes associated with the lighting device. As another example, an automatic door locking device can include a locking capability, an unlocking capability and/or other suitable capability.

Instead of providing suggestions to a user to configure smart devices for any 3Ps that lack any smart device in the device topology representation, implementations disclosed herein provide a suggestion for configuring smart device(s) of a 3P based on also determining that a 3P application of that 3P is installed at a client device associated with a user account of the user, where the 3P application enables control of one or more 3P smart devices of the 3P. In these and other manners, a suggestion for configuring smart device(s) of a 3P may only be provided responsive to determining that the user has installed an application, of the 3P, that enables control of smart devices of the 3P. This can ensure that provided suggestions are for 3Ps for which a user likely has associated smart devices.

In some implementations, a suggestion to configure a smart device may be provided through the home control application 115. For example, referring to FIG. 5, an interface of the home control application is provided. The interface 500 includes graphical elements 505, 510, and 515 to allow the user to change the status of "Light 1," "Light 2," and "Light 3." Further, interface 500 includes a suggestion 520 that indicates smart device(s) from a particular 3P ("3P ABC") are not configured, along with a prompt to add the device(s) to the device topology representation. Upon affirmative input from the user (e.g., speaking "YES", or selection of the "YES" interface element), device configuration engine 160 can interact with a corresponding one of the 3P remote servers $110_{1-N}$ to add any device(s) of the user to the device topology representation.

In some implementations, in response to receiving affirmative input from the user, the device configuration engine 160 attempts to interface with a corresponding one of the 3P remote servers $110_{1-N}$ utilizing a user account that is associated with the home control application 115 and/or an automated assistant application. For example, that user account can also be utilized by the user for the corresponding 3P, enabling the device configuration engine 160 to utilize that user account to verify the user with the corresponding 3P, without necessitating prompting of the user for additional sign-in information. The device configuration engine 160 can interface with an application programming interface (API) of the 3P in automatically adding, to the smart device topology, particular devices, of at least some of the one or more 3P smart devices party application that is associated with the unconfigured smart device to configure the device to be controllable by the home control application.

In some implementations, in response to receiving affirmative input from the user, the device configuration engine 160 presents a sign-in interface that enables signing-in to a 3P account that is particularized to the 3P and that, when utilized to sign-in to the 3P account, causes interfacing with the API, or an additional API, of the 3P in automatically adding the particular devices to the smart device topology.

In some of those implementations, the device configuration engine first attempts to sign in using the user account that is associated with the home control application 115 and/or an automated assistant application, then only presents the sign-in interface if such attempt fails.

In some implementations, in response to receiving affirmative input from the user, the device configuration engine 160 interfaces (e.g., via an operating system of the client device 105) with one of the third party applications 125 in automatically adding smart device(s) of the 3P to the smart device topology. In some of those implementations, a particular application (e.g., home control application 115) can incorporate all or aspects of the device configuration engine 160 and can validate the third party application. If the third party application is validated, the device configuration engine 160 can provide an intent to execute the third party application with a linking function. For example, the intent can be provided to an operating system of the client device 105 to cause the operating system client device to execute the third party application by calling the intent. The intent can be specific to a linking function of the third party application that, when executed by the third party application, causes the third party application to return at least one access token (e.g., a long-term and/or short-term access token) if one or more conditions are satisfied. The one or more conditions can include, for example, verification of the application providing the intent, as described in more detail below. The at least one access token can be received from the third party application responsive to providing the intent. Further, the device configuration engine 160 can utilize the at least one access token to obtain additional information related to the 3P smart device(s), and at least some of the obtained additional information can be added to the smart device topology. The access token can also enable control of the 3P smart device(s) (e.g., by including it in requests from the automated assistant and/or in obtaining updated short-term access tokens).

Figure 5:
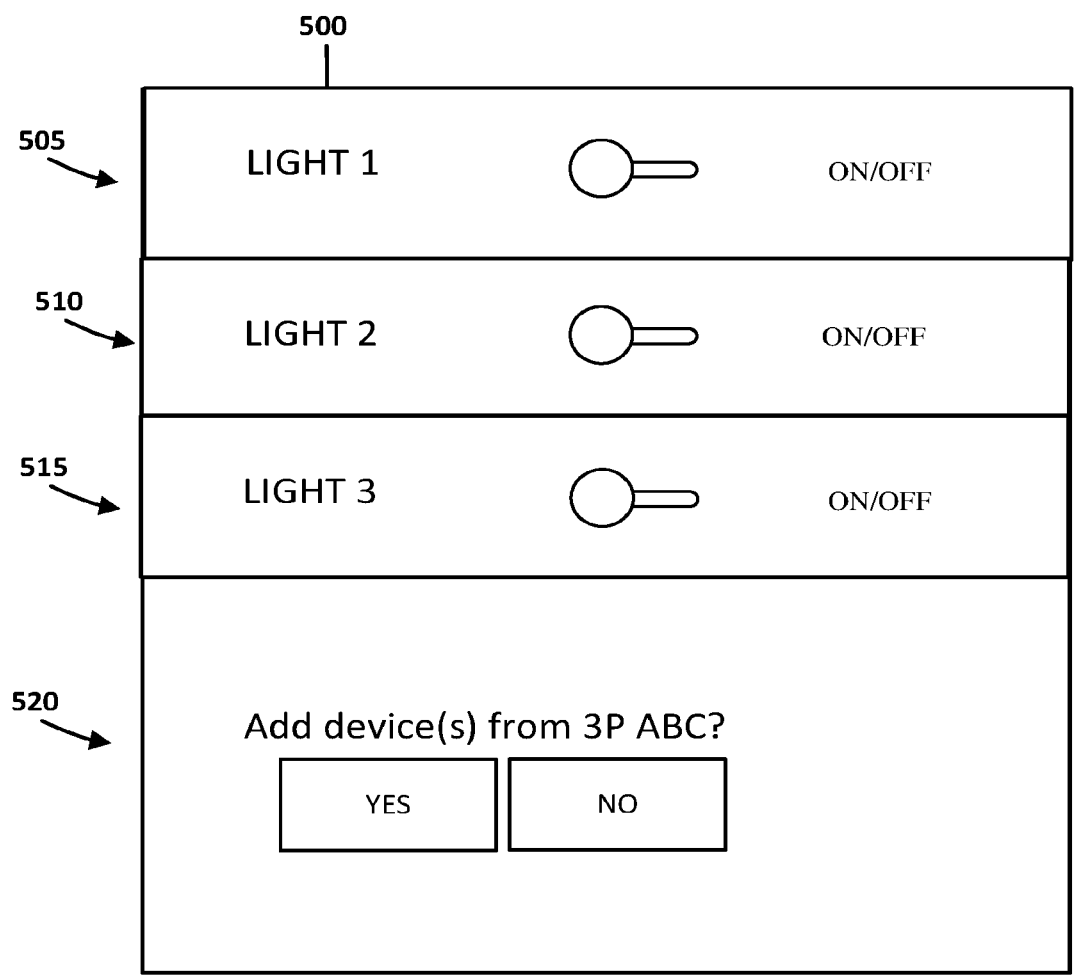
FIG. 5 illustrates an example interface that includes graphical interface elements for controlling various smart devices, and that includes a suggestion to add smart device(s) of a third-party to a smart device topology.

In some implementations, the suggestion for configuring a smart device may be provided to the user only when the user is accessing a home control application, as illustrated in FIG. 5. However, in some implementations, the suggestion may be additionally or alternatively provided regardless of whether the user is accessing the home control application and/or any other active application. For example, the suggestion may appear on a home screen of the client device, via one or more notification messages via an automated assistant, and/or any other interface element that executes on the client device regardless of whether any application is active.

Figure 6:
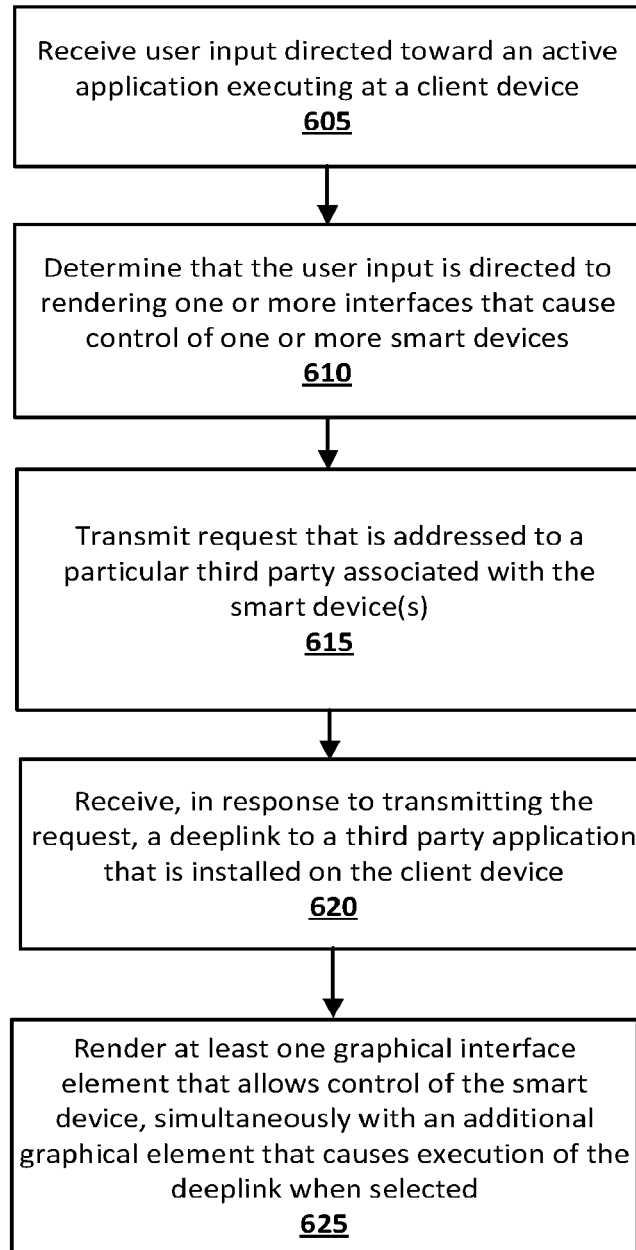
FIG. 6 is a flowchart illustrating an example method according to various implementations disclosed herein.

FIG. 6 illustrates a flowchart of an example method. The steps of FIG. 6 can be performed by one or more processors, such as one or more processors of a client device. Other implementations may include additional steps than those illustrated in FIG. 6, may perform step(s) of FIG. 6 in a different order and/or in parallel, and/or may omit one or more of the steps of FIG. 6.

At step 605, user input directed toward an active application executing at a client device is received. The user input is provided via one or more user input devices, such as a touch-screen display, microphone(s), or other input device(s). In some implementations, the active application may be a home control application such as home control application 115 of FIG. 1.

At step 610, one or more components determine that the user input is directed to rendering one or more interfaces that causes control of one or more smart devices. The smart devices may share one or more characteristics with smart devices 145A and/or 145B, as illustrated in FIG. 1. For example, the smart device(s) may include a thermostat, smart lighting unit, camera, and/or other device that is manufactured by a third party that is associated with one or more software components executing on the client device and/or one or more other devices. The interface of the active application allows one or more inputs to be provided via one or more components to allow the user, via the input, to control the one or more of the third party smart devices.

At step 615, a request is transmitted that is addressed to an address of the third party for the third party associated with the smart device(s) to which the user input of step 605 is directed. The request includes at least an identifier of the one or more particular smart devices. For example, a user may provide input to control a smart lighting unit "123" that is associated with third party "ABC," and a request can be generated that is addressed to an address of a system associated with "ABC", and that includes an identifier of lighting unit "123."

At step 620, in response to providing the request, a deeplink is received, where the deeplink is to a third party application that is installed on the client device. The deeplink is generated (optionally in real-time) by the third party system, in response to the request of step 615, is configured to cause the third party application to open in a state that presents additional information for the one or more particular devices. For example, third party "ABC" can be associated with an application that, when installed on the client device, allows the user to control lighting unit "123" via one or more interfaces directed to lighting unit "123." The third party application, when accessed using the deeplink, presents additional information that is not included with the interface of the active application. For example, the active application may allow for a user to turn a lighting unit on or off, but not allow the user to control the color emitted by the lighting unit. However, the interface associated with the deeplink may include such functionality.

At step 625, at least one graphical interface element is rendered that, when interacted with via further user interface input, allows control of the smart device. An additional graphical element is also rendered simultaneously that, when interacted with (e.g., selected), causes execution of the deeplink. For example, execution of the deeplink can cause the third party application to open and present additional information for the particular smart device. For instance, the additional graphical element can be a selectable button that is provided with the interface of the active application that is directed to lighting unit "123." Upon interaction with the button, the deeplink can be executed to cause the third party application to open to an interface that is associated with lighting unit "123" and that includes additional information related to lighting unit "123." The additional information may include, for example, one or more graphical elements that allow the user to change the emitted color temperature of the lighting unit "123."

Figure 7A:
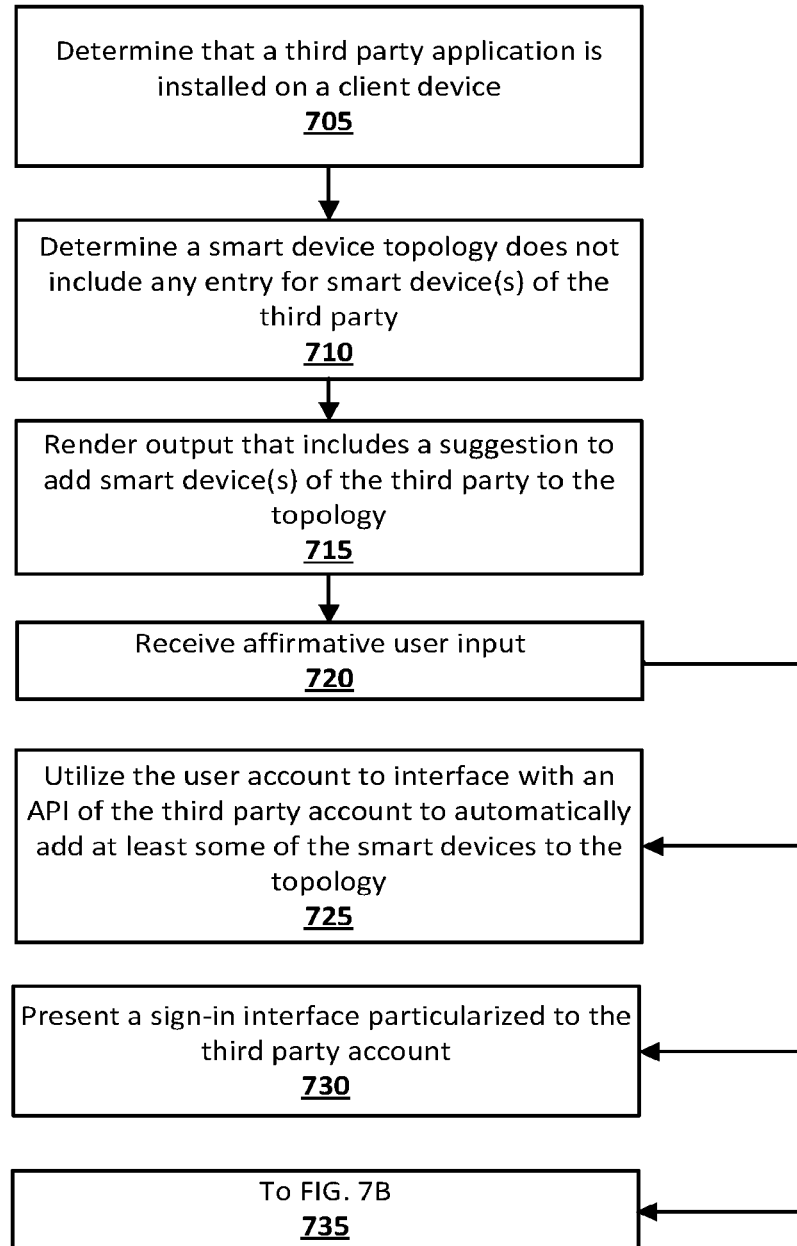
FIG. 7A is a flowchart illustrating another example method according to various implementations disclosed herein.

FIG. 7A illustrates a flowchart of an example method. The steps of FIG. 7A can be performed by one or more processors, such as one or more processors of a client device. Other implementations may include additional steps than those illustrated in FIG. 7A, may perform step(s) of FIG. 7A in a different order and/or in parallel, and/or may omit one or more of the steps of FIG. 7A.

At step 705, it is determined that a third party application is installed on a client device. The third party application enables control of one or more smart devices of the third party and may share one or more characteristics with third party applications 125 as described herein with regard to FIG. 1. In some implementations, the third party application can be determined based on a package name, or other identifier of the third party application, and can be identified based on a stored association of the third party application with smart device control.

At step 710, it is determined that a smart device topology, that is associated with a user account of the client device and/or the client device, does not include any entry for smart devices of the third party. The user account can include, for example, a user account associated with an automated assistant that is accessible via the client device (e.g., via an automated assistant application of the client device). The smart device topology can be utilized by the automated assistant in control of various smart devices.

At step 715, in response to determining that the smart device topology does not include an entry for any of the smart devices of the third party, output is rendered that includes a suggestion to the user to add smart device(s), of the third party, to the smart device topology. The suggestion may share one or more characteristics with the suggestion that is illustrated in FIG. 5. For example, a suggestion may include an identifier of the third party and one or more graphical elements that allow the user to select whether to add smart device(s) of the third party to the smart device topology.

At step 720, affirmative user input is received in response to rendering the output at step 715. For example, the output can include an interface element that is selectable to confirm the user desires to add the smart device(s), and the affirmative user input can be a selection of the interface element. Also, for example, the affirmative user input can be a spoken "yes" or "yes, add the smart devices", that is provided responsive to rendering the output at step 715. If affirmative user input is not received (e.g., within a threshold amount of time of rendering the output at step 715) or negative user input is instead received (e.g., a spoken "no", a selection of a "no" interface element, or a dismissal of the output), the method of FIG. 7 can end.

In response to receiving the affirmative input at step 720, one of steps 725, 730, and 735 can be performed. In some implementations, multiple of steps 725, 730, and 735 are attempted (in any order and/or in parallel), and only one will be successful. In some of those implementations, step 730 is only performed upon determining that step 725 and/or step 735 cannot be successfully performed. As described herein, step 725 and/or step 735 can obviate the need for the user to provide any further input (or at least provide reduced duration of input relative to step 730) and can be advantageous to users with low dexterity and/or other users. Accordingly, user input is further reduced at least when steps 725 and/or step 735 are performed.

At step 725, the user account is utilized to interface with an API of the third party to automatically add at least some of the smart devices to the topology. For example, the user account utilized for the assistant of the client device may also be accepted by the third party. For instance, the user account can be a single sign-on account and may have been utilized by the user as the user account for the assistant, and as one (the only one, or one of many) account for the third party. In interfacing with the API of the third party, the single sign-on account can be utilized as an authorization, and access token(s) and/or additional information provided by the third party systems during the interfacing. The access token(s) can be utilized by the assistant to enable control (direct or indirect) of smart devices of the third party and the additional information can include, for example, identifier(s) of the smart device(s) of the third party that are associated with the user account, other attribute(s) of the smart device(s), and/or other information related to the smart device(s). In response to interfacing with the API of the third party and obtaining token(s) and/or other information, the smart device topology can be updated to include one or more nodes associated with the smart devices and identifiers of the smart device so the automated assistant can subsequently control the smart device.

At step 730, a sign-in interface that is particularized to a third party account is presented. The interface can be utilized to sign in to the to the third party account in order to interface with the API of the third party utilizing a third party account that is distinct from the account associated with the automated assistant. Once the third party account has been signed into, the smart device can be added to the smart device topology. For example, a user may utilize the interface to enter a username and/or password and the API of the third party may be accessible only after affirmation that the user has an account with the third party. Once confirmed, one or more components may interact with the third party via the API to receive access token(s) and other information to enable control of the smart device(s) and/or to add the smart devices to the topology.

Figure 7B:
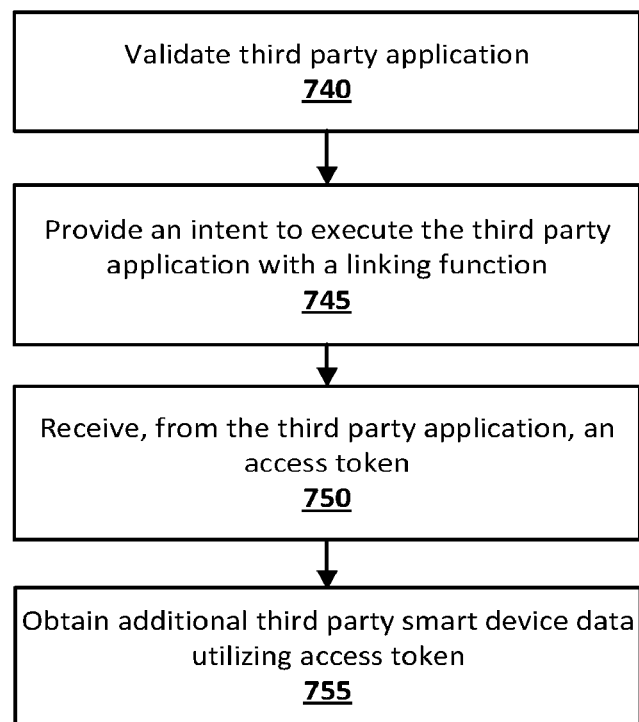
FIG. 7B is a flowchart illustrating yet another example method according to various implementations disclosed herein.

At step 735, one or more steps of FIG. 7B are performed. FIG. 7B illustrates a flowchart of an example method. The steps of FIG. 7B can be performed by one or more processors, such as one or more processors of a client device. Other implementations may include additional steps than those illustrated in FIG. 7B, may perform step(s) of FIG. 7B in a different order and/or in parallel, and/or may omit one or more of the steps of FIG. 7B. In various implementations the steps of FIG. 7B are performed following steps 705, 710, 715, and 720 of FIG. 7A. However, it is noted that in various alternative implementations one or more steps of FIG. 7B can be performed without performance of one or more (e.g., any) steps of FIG. 7A. For example, the steps of FIG. 7B can be performed responsive to a user manually navigating, within a home application and/or other application, to an option to add third party device(s) to an assistant account, and selecting that option. Also, for example, the steps of FIG. 7B can be performed automatically (i.e., without any further user input) responsive to performing steps 705 and 710 of FIG. 7A.

At step 740, the third party application is validated. For example, the third party application can be initially identified (e.g., at step 705) based on a package name of the third party application, but can be validated using a previously provided signature of the third party application. For instance, the third party application can be validated by obtaining a signing signature of the third party application and comparing the hashed signature (e.g., hashed using SHA-256 or other cryptographic hash algorithm) with one that was provided as part of an onboarding process by the third party. For example, a third party system may have previously provided, to a first party system operating the automated assistant and/or operating an operating system of the client device, a valid hashed signature for the third party application. The signing signature of the third party application installed on the client device can be compared to such a previously provided hash signature to verify that the third party application installed is indeed the application of the third party (and not an "impostor" application).

At step 745, an intent is provided to execute the third party application with a linking function. For example, the intent can be provided (e.g., by an automated assistant application or a home control application) to an operating system of the client device to cause the operating system client device to execute the third party application by calling the intent. The intent can be specific to a linking function of the third party application that, when executed by the third party application, causes the third party application to return at least one access token (e.g., a long-term and/or short-term access token) if one or more conditions are satisfied. The one or more conditions can include, for example, verification of the application providing the intent, as described in more detail below. The provided intent can optionally include a client identifier, such as an identifier of the user account associated with the automated assistant application or home control application, and/or can optionally include an indication of scope(s) of access and/or token(s) being requested. In some implementations, if the operating system attempts to resolve a target for the intent in the third party application, but no resolution is found, it can be assumed that the third party application does not support the linking function and the method of FIG. 7B can end (and an error message optionally presented).

At step 750, an access token is received from the third party application. In some implementations, the third party application interfaces with one or more remote systems of the third party in obtaining the access token. In some other implementations, the access token can be previously provided, by the one or more remote systems of the third party, to the third party application for local storage on the client device with access restrictions. In implementations where the access token is locally stored on the client device, latency in adding smart devices of the third party to a topology can be reduced.

In some implementations, when the third party application is executed with the linking function responsive to the provided intent, the third party application first verifies the intent request before providing the access token. For example, it can verify the request by validating that the calling application (the one that provided the intent) is an automated assistant application or other validated application. For instance, it can obtain the signature of the calling application and compare that against a previously provided signature provided to the third party system (e.g., during an onboarding process) as a real signature of the automated assistant application, a home control application, or of another verified application. In some implementations, the third party application can provide an error if it is unable to return an access token. In some of those implementations, the error can indicate that it is a recoverable error, and a new intent (e.g., with an alternate linking function and/or other parameter(s)) provided in response to the error indicating it is recoverable. In some other implementations, the error can indicate that it is not a recoverable error, and no further intent provided in response to the error indicating it is not a recoverable error.

At step 755, the access token is utilized to obtain additional third party smart device data. For example, the access token can be utilized to interface, via a network, with a remote system of the third party application and obtain additional information related to the particular smart devices. At least some of the obtained additional information can be added to the smart device topology. The access token can also enable control of the 3P smart device(s) by an automated assistant (e.g., by including it in requests from the automated assistant and/or in obtaining updated short-term access tokens that can be included in requests).

Figure 8:
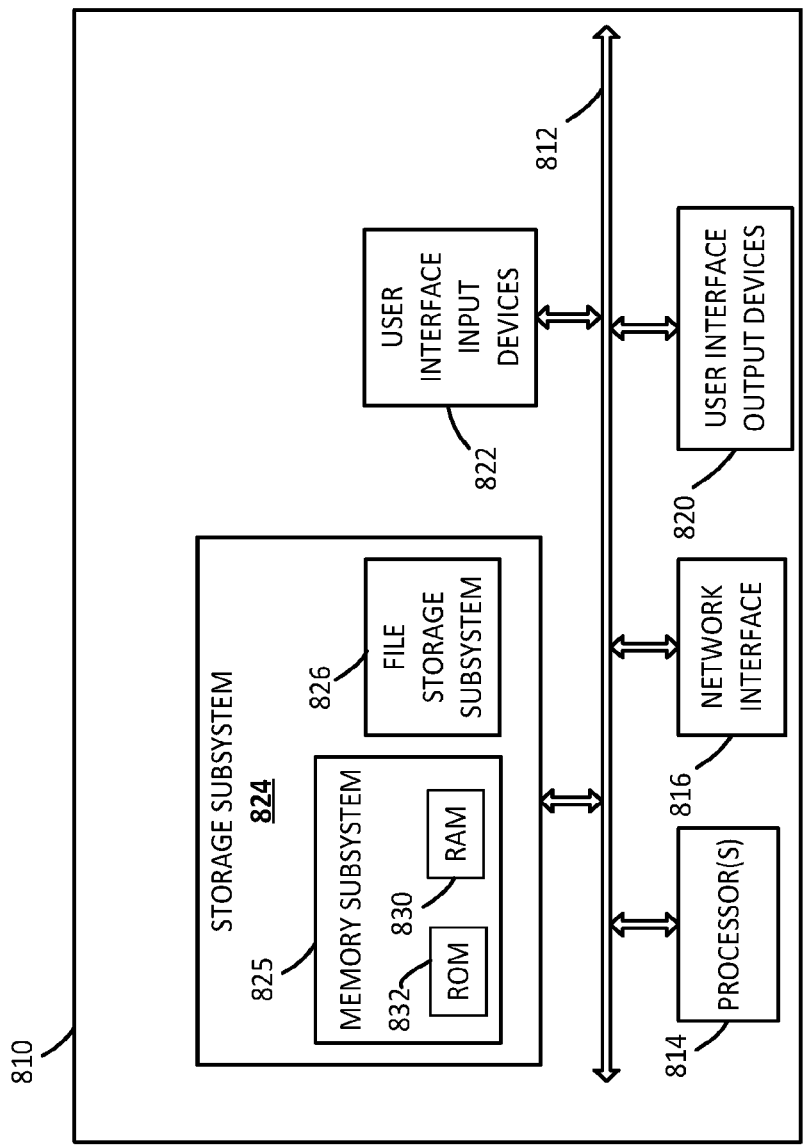
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods described herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method performed by one or more processors is provided that includes receiving user interface input directed toward an active application executing at a client device. The user interface input is provided via a user interface input device of a client device. The method further includes determining that the user interface input is a request for rendering, via the active application, of at least one interactive graphical interface element that, when interacted with via further user interface input, causes corresponding control of one or more particular smart devices of a particular third-party (3P). The active application enables control of multiple smart devices of multiple third parties (3Ps), including the one or more particular smart devices of the particular 3P. The method further includes, responsive to determining that the user interface input is the request for rendering the at least one interactive graphical interface element that, when interacted with via further user interface input, causes corresponding control of the one or more particular smart devices of the particular 3P: transmitting, over one or more networks, a request that is addressed to a particular 3P address for the particular 3P, and that includes an identifier of the one or more particular smart devices. The method further includes receiving, responsive to transmitting the request and from the particular 3P: a deeplink to a 3P application that is installed at the client device, and that is controlled by the 3P. The received deeplink is configured, based on the request including the identifier of the one or more particular smart devices, to cause the client device to open the 3P application in a state that presents additional information for the one or more particular smart devices. The method further includes, causing, responsive to the user interface input, the active application to simultaneously render: the at least one interactive graphical interface element that, when interacted with via further user interface input, causes corresponding control of the one or more particular smart devices of the particular 3P; and a selectable 3P element that, when selected, causes execution of the deeplink to cause the client device to open the 3P application in the state that presents additional information for the one or more particular smart devices.

These and other implementations of technology disclosed herein may optionally include one or more of the following features.

In some implementations the additional information for the one or more particular smart devices includes at least one additional graphical element that, when interacted with, causes control of one or more properties of the one or more particular smart devices. The control of the one or more properties of the one or more particular smart devices is not enabled via interaction with the at least one interactive graphical interface element rendered via the application. In some implementations, the identifier of the one or more particular smart devices is a unique identifier of the one or more particular smart devices, the unique identifier is utilized in interactions between the application and the 3P, and the unique identifier is locally mapped by the 3P to a proprietary identifier, of the one or more particular smart devices, that is proprietary to the 3P.

In some implementations, the method further includes, prior to receiving the user interface input directed toward the active application executing at the client device: determining that the 3P application is installed at the client device. In some of those implementations, transmitting the request is contingent on having determined that the 3P application is installed at the client device. Determining that the 3P application is installed at the client device can include interfacing with an application programming interface (API), of an operating system of the client device, to determine that the 3P application is installed at the client device.

In some implementations, the one or more smart devices include a camera, and the additional information for the one or more particular smart devices include at least a video clip recently captured via the camera.

In some implementations, the method further includes: receiving, responsive to transmitting the request and from the particular 3P, an indication of the selectable 3P element; and selecting the selectable 3P element, from a plurality of candidate 3P elements for the 3P, for rendering, where selecting the selectable 3P element is based on the indication of the selectable 3P element being received responsive to transmitting the request.

In some implementations, the method further includes, subsequent to causing the active application to simultaneously render the at least one interactive graphical interface element and the selectable 3P element: receiving an additional user interface input directed toward the active application; determining that the additional user interface input is a request for rendering, via the active application, of the at least one interactive graphical interface element that, when interacted with via further user interface input, causes corresponding control of the one or more particular smart devices of the particular 3P; responsive to determining that the user interface input is the request for rendering the at least one interactive graphical interface element that, when interacted with via further user interface input, causes corresponding control of the one or more particular smart devices of the particular 3P: transmitting, over one or more networks, another instance of the request that is addressed to the particular 3P address for the particular 3P, and that includes the identifier of the one or more particular smart devices; receiving, responsive to transmitting the request and from the particular 3P: a different deeplink to the 3P application that is installed at the client device, where the received different deeplink is different than the deeplink, and is configured, based on the request including the identifier of the one or more particular smart devices, to cause the client device to open the 3P application in a different state that presents different information for the one or more particular smart devices; and causing, responsive to the additional user interface input, the active application to simultaneously render: the at least one interactive graphical interface element that, when interacted with via further user interface input, causes corresponding control of the one or more particular smart devices of the particular 3P, and the selectable 3P element, or an additional selectable 3P element that, when selected, causes execution of the different deeplink to the client device to open the 3P application in the different state that presents the different information for the one or more particular smart devices.

In some implementations, the method further includes, subsequent to causing the active application to simultaneously render the at least one interactive graphical interface element and the selectable 3P element: receiving an additional user interface input directed toward the active application; determining that the additional user interface input is a request for rendering, via the active application, of the at least one interactive graphical interface element that, when interacted with via further user interface input, causes corresponding control of the one or more particular smart devices of the particular 3P; responsive to determining that the user interface input is the request for rendering the at least one interactive graphical interface element that, when interacted with via further user interface input, causes corresponding control of the one or more particular smart devices of the particular 3P: transmitting, over one or more networks, another instance of the request that is addressed to the particular 3P address for the particular 3P, and that includes the identifier of the one or more particular smart devices; receiving, responsive to transmitting the request and from the particular 3P: a different deeplink to the 3P application that is installed at the client device, wherein the received different deeplink is different than the deeplink, and is configured, based on the request including the identifier of the one or more particular smart devices, to cause the client device to open the 3P application in the same state as the deeplink; and causing, responsive to the additional user interface input, the active application to simultaneously render: the at least one interactive graphical interface element that, when interacted with via further user interface input, causes corresponding control of the one or more particular smart devices of the particular 3P, and the selectable 3P element, or an additional selectable 3P element that, when selected, causes execution of the different deeplink to cause the client device to open the 3P application in the same state that presents the same information for the one or more particular smart devices.

In some implementations, the method further includes: receiving a further additional user interface input directed toward the active application; determining that the further user interface input is a request for rendering, via the active application, of the at least one further interactive graphical interface element that, when interacted with via further user interface input, causes corresponding control of one or more further smart devices of a further 3P that is distinct from the particular 3P; determining that the client device lacks a further 3P application that is controlled by the further 3P; responsive to determining that the further user interface input is the request for rendering the at least one further interactive graphical interface element, and that the client device lacks the further 3P application: causing the active application to simultaneously render: the at least one further interactive graphical interface element that, when interacted with via further user interface input, causes corresponding control of the one or more further smart devices of the further 3P and a further selectable 3P element that, when selected, causes the client device to present an option for installation of the further 3P application.

In some implementations, a method implemented by one or more processors is provided and includes determining that a third-party (3P) application is installed at a client device associated with a user account. The 3P application enables control of one or more 3P smart devices of the 3P. The method further includes determining that a smart device topology, that is associated with the user account and that is utilized by an automated assistant in controlling smart devices via interaction with the automated assistant, lacks any entries for any of the one or more 3P smart devices of the 3P. The method further includes, responsive to determining that the 3P application is installed at the client device and that the smart device topology lacks any entries for any of the one or more 3P smart devices: causing output to be rendered, at the client device or an additional client device associated with the user account, where the output includes a suggestion for adding the 3P to the smart device topology. The method further includes receiving affirmative user interface input in response to rendering of the output and responsive to receiving the affirmative user interface input: using the user account to interface with an application programming interface (API) of the 3P in automatically adding, to the smart device topology, particular devices, of at least some of the one or more 3P smart devices; interfacing with the third party application installed at the client device in automatically adding the particular smart devices to the smart device topology; or presenting a sign-in interface that enables signing-in to a 3P account that is particularized to the 3P and that, when utilized to sign-in to the 3P account, causes interfacing with the API, or an additional API, of the 3P in automatically adding the particular devices to the smart device topology.

These and other implementations of technology disclosed herein may optionally include one or more of the following features.

In some implementations, the method includes using the user account to interface with the API of the 3P in automatically adding, to the smart device topology, particular devices, of at least some of the one or more 3P smart devices. In some of those implementations, no additional prompts are presented to the user following the receiving of the affirmative user interface input, and before completion of the automatically adding the particular devices to the smart device topology.

In some implementations, the method includes presenting the sign-in interface that enables signing-in to the 3P account that is particularized to the 3P and that, when utilized to sign-in to the 3P account, causes interfacing with the API, or the additional API, of the 3P in automatically adding the particular devices to the smart device topology. In some of those implementations, presenting the sign-in interface occurs responsive to a failed attempt to use the user account to interface with the API of the 3P.

In some implementations, the output includes graphical output rendered by a home control application.

In some implementations, the output includes graphical and/or audible output rendered by an automated assistant application.

In some implementations, responsive to receiving the affirmative user interface input, the method includes interfacing with the third party application installed at the client device in automatically adding the particular smart devices to the smart device topology. In some versions of those implementations, interfacing with the third party application in automatically adding the particular smart devices to the smart device topology includes: validating the third party application using a previously provided signature for the third party application; responsive to validating the third party application, providing an intent that causes the third party application to execute with a linking function; and receiving an access token from the third party application in response to providing the intent. In some of those versions, when the third party application is executed with the linking function, the third party application: validates the intent was provided by a verified application using a previously provided signature of the verified application; and returns the access token in response to validating the intent was provided by the verified application. In some implementations, interfacing with the third party application in automatically adding the particular smart devices to the smart device topology includes: utilizing the access token to interface, via a network, with a remote system of the third party application and obtain additional information related to the particular smart devices; and adding at least some of the additional information to the smart device topology.

In some implementations, a method implemented by one or more processors of a client device is provided and includes determining that a third-party (3P) application is installed at the client device. The 3P application enables control of one or more 3P smart devices of the 3P. The method further includes determining that a smart device topology, that is associated with the client device and that is utilized by an automated assistant in controlling smart devices via interaction with the automated assistant, lacks any entries for any of the one or more 3P smart devices of the 3P. The method further includes validating the third party application using a previously provided signature for the third party application. The method further includes, responsive to validating the third party application and responsive to determining that the 3P application is installed at the client device and that the smart device topology lacks any entries for any of the one or more 3P smart devices: interfacing with the third party application installed at the client device in automatically adding the particular smart devices to the smart device topology.

These and other implementations of technology disclosed herein may optionally include one or more of the following features.

In some implementations, interfacing with the third party application in automatically adding the particular smart devices to the smart device topology includes: providing an intent that causes the third party application to execute with a linking function; and receiving an access token from the third party application in response to providing the intent. In some of those implementations, the method is performed by a particular application of the client device, and when the third party application is executed with the linking function, the third party application: validates the particular application based on the particular application having provided the intent; and returns the access token in response to validating the particular application. In some implementations, interfacing with the third party application in automatically adding the particular smart devices to the smart device topology includes: utilizing the access token to interface, via a network, with a remote system of the third party application and obtain additional information related to the particular smart devices; and adding at least some of the additional information to the smart device topology.

What is claimed is:

1. A computer-implemented method, comprising:
determining that a third-party (3P) application associated with a 3P user account is installed at a client device;
determining that an automated assistant user account of a user lacks any association to the 3P user account of the user, wherein the automated assistant user account is associated with an automated assistant application installed at the client device;
responsive to determining that the 3P application is installed at the client device and responsive to determining that the automated assistant user account lacks any association to the 3P user account:
    causing the automated assistant application, also installed at the client device, to render output, at the client device, that includes a suggestion for associating the automated assistant user account with the 3P user account;
receiving affirmative user interface input in response to rendering of the output; and
responsive to receiving the affirmative user interface input, and responsive to determining that the 3P application, of the 3P, is installed at the client device:
    providing, to the 3P application installed at the client device, an intent that causes the 3P application to execute with a linking function;
receiving, from the 3P application in response to providing the intent, an access token obtained by the 3P application responsive to executing with the linking function; and
using the access token, received from the 3P application, to create an association of the automated assistant user account to the 3P user account.

2. The method of claim 1, wherein when the 3P application is executed with the linking function, the 3P application:
validates that the intent was provided by the automated assistant application using a previously provided signature of the automated assistant application; and
returns the access token in response to validating that the intent was provided by the automated assistant application.

3. The method of claim 1, wherein the 3P application enables control of one or more smart devices manufactured by the 3P, and wherein the one or more smart devices includes a particular 3P smart device.

4. The method of claim 3, further comprising:
controlling, via an interface of the client device and based on the created association of the automated assistant user account to the 3P user account, the particular 3P smart device.

5. The method of claim 3, further comprising:
utilizing the access token to obtain additional information for the particular 3P smart device.

6. The method of claim 5, wherein utilizing the access token to obtain the additional information for the 3P smart device comprises:
utilizing the access token to interface, via a network and with a remote system of the 3P application, to obtain the additional information.

7. The method of claim 6, further comprising:
adding at least some of the additional information to a smart device topology that is utilized by the automated assistant application.

8. The method of claim 7, wherein the at least some of the additional information, added to the smart device topology, includes an identifier of the particular 3P smart device.

9. The method of claim 5, wherein the additional information includes at least one graphical element that, when interacted with, causes control of one or more properties of the particular 3P smart device.

10. A computer-implemented method, comprising:
determining that a third-party (3P) application associated with a 3P user account is installed at a client device;
determining that a home control user account of a user lacks any association to the 3P user account of the user, wherein the home control user account is associated with a home control application installed at the client device;
responsive to determining that the 3P application is installed at the client device and responsive to determining that the home control user account lacks any association to the 3P user account:
  causing the home control application, also installed at the client device, to render output, at the client device, that includes a suggestion for associating the home control user account with the 3P user account;
receiving affirmative user interface input in response to rendering of the output; and
responsive to receiving the affirmative user interface input, and responsive to determining that the 3P application, of the 3P, is installed at the client device:
  providing, to the 3P application installed at the client device, an intent that causes the 3P application to execute with a linking function;
  receiving, from the 3P application in response to providing the intent, an access token obtained by the 3P application responsive to executing with the linking function; and
  using the access token, received from the 3P application, to create an association of the home control user account to the 3P user account.

11. The method of claim 10, wherein when the 3P application is executed with the linking function, the 3P application:
validates that the intent was provided by the home control application using a previously provided signature of the home control application; and
returns the access token in response to validating that the intent was provided by the home control application.

12. The method of claim 10, wherein the 3P application controls one or more smart devices manufactured by the 3P, and wherein the one or more smart devices includes a particular 3P smart device.

13. The method of claim 12, further comprising:
controlling, via an interface of the client device and based on the created association of the home control user account to the 3P user account, the particular 3P smart device of the one or more smart devices.

14. The method of claim 12, further comprising:
utilizing the access token to obtain additional information for the particular 3P smart device.

15. The method of claim 14, wherein utilizing the access token to obtain the additional information for the 3P smart device data comprises:
utilizing the access token to interface, via a network, with a remote system of the 3P application, to obtain the additional information of the particular 3P smart device.

16. The method of claim 14, wherein the additional information includes an identifier of the particular 3P smart device.

17. A computer-implemented method, comprising:
determining that a third-party (3P) application is installed at a client device,
  wherein the 3P application enables control of one or more smart devices manufactured by the 3P, and wherein the one or more smart devices includes a particular 3P smart device;
determining that an automated assistant user account of a user lacks any association to a 3P user account of the user, wherein the automated assistant user account is associated with an automated assistant application installed at the client device;
responsive to determining that the automated assistant user account lacks any association to the 3P user account:
  causing the automated assistant application, also installed at the client device, to render output, at the client device, that includes a suggestion for associating the automated assistant user account with the 3P user account;
receiving affirmative user interface input in response to rendering of the output; and
responsive to receiving the affirmative user interface input, and responsive to determining that the 3P application, of the 3P, is installed at the client device:
  providing, to the 3P application installed at the client device, an intent that causes the 3P application to execute with a linking function;
  receiving, from the 3P application in response to providing the intent, an access token obtained by the 3P application responsive to executing with the linking function;
  using the access token, received from the 3P application, to create an association of the automated assistant user account to the 3P user account;
  utilizing the access token to obtain additional information for the particular 3P smart device, comprising:
    utilizing the access token to interface, via a network and with a remote system of the 3P application, to obtain the additional information; and
  adding at least some of the additional information to a smart device topology that is utilized by the automated assistant application.

18. The method of claim 17, wherein the at least some of the additional information, added to the smart device topology, includes an identifier of the particular 3P smart device.

19. The method of claim 17, wherein the additional information includes at least one graphical element that, when interacted with, causes control of one or more properties of the particular 3P smart device.

20. The method of claim 17, further comprising:
controlling, via an interface of the client device and based on the created association of the automated assistant user account to the 3P user account, the particular 3P smart device.

* * * * *